Dec. 8, 1964  F. F. HOLUB ETAL  3,160,603
WHOLLY AROMATIC POLY-P-PHENYLENE CHLOROISOPHTHALATES
Filed June 1, 1960
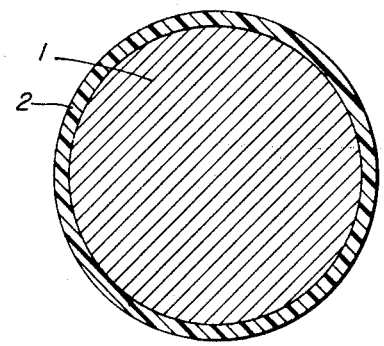
Inventors:
Fred F. Holub;
Simon W. Kantor,
by
Their Agent.

United States Patent Office 3,160,603
Patented Dec. 8, 1964

3,160,603
WHOLLY AROMATIC POLY-p-PHENYLENE CHLOROISOPHTHALATES
Fred F. Holub, Scotia, and Simon W. Kantor, Schenectady, N.Y., assignors to General Electric Company, a corporation of New York
Filed June 1, 1960, Ser. No. 33,127
11 Claims. (Cl. 260—47)

This invention relates to synthetic polymeric compositions, and more particularly, to a chlorine-containing, p-phenylene isophthalate, linear superpolyester having an intrinsic viscosity of at least 0.5, wherein at least 15 mole percent of the isophthalate groups have from 1 to 2 chlorine substituents on the aryl nucleus and the p-phenylene groups are selected from the group consisting of p-phenylene, monochloro-p-phenylene, and dichloro-p-phenylene groups.

Although superpolyesters are well known in the art, superpolyesters have had to have an aliphatic component in the polymer chain in order for them to be obtained with the high molecular weight characteristic of the superpolyesters. The ordinary resinous esters of a dicarboxylic acid and a dihydric alcohol are polymers having many monomeric units in the polymer molecule, but they still have relatively low molecular weights as compared to the superpolyesters. Because of the longer polymer molecule associated with the higher molecular weights, the superpolyesters have many useful properties not possessed by the corresponding resinous esters, for example, the impact, flexible and tensile strength properties, are much greater and furthermore, the films and fibers which can be formed from the superpolyesters can be structurally oriented by cold drawing techniques to produce films and fibers which are much more flexible and of higher strength properties in the direction of orientation than the unoriented products.

It has long been known that aromatic ring compounds are much more stable and have much more desirable high temperature properties than the corresponding aliphatic compounds. Unfortunately, the aromatic compounds usually have correspondingly higher melting points. Therefore, there have been many attempts to prepare polyesters from dihydric phenols and aromatic dicarboxylic acids for use in applications requiring the ability to withstand degradation at elevated temperatures. However, in all attempts the product has been an infusible, insoluble polymer, or a very brittle polymer of no utility, depending on the particular phenol and acid chosen. The closest approach to obtaining a completely aromatic superpolyester has been to react a dihydric phenol with an alkylene oxide to produce a bis(hydroxyalkoxy)aryl compound. For example, in order to make a superpolyester using hydroquinone, the latter is first reacted with, for example, ethylene oxide, to produce 1,4-bis($\beta$-hydroxyethoxy)benzene. These compounds are esterified by reaction with a dibasic acid or a dibasic acid chloride, or by an ester interchange reaction to form its corresponding superpolyester. The alkyl groups in the polymer chain lowered the melting point and increased the solubility sufficiently that either melt or solvent processes could be used for carrying out the reaction. Although such a procedure permitted dihydric phenols and aromatic dicarboxylic acids to be incorporated into superpolyesters, the high temperature stability of the product was sacrificed, due to the introduction of the aliphatic groups into the polymeric chain. Any attempt to react dihydric phenol with a dicarboxylic acid or the ester or acid chloride derivative thereof always resulted in the obtaining of low molecular weight materials which were insoluble and infusible or extremely brittle. The melt process failed because of the fact that even the melting point of the low molecular weight material was so high that thermal decomposition of the polymer always resulted prior to the obtaining of the required high molecular weight material. The ester interchange or the reaction of the acid chloride always failed because of the fact that if carried out in solution the low molecular weight material was precipitated from the solution and was incapable of reacting further to form the high molecular weight material. Attempts to heat the low molecular weight polymer or carry out the reaction without the use of solvents always failed, again because thermal decomposition took precedence over the formation of the high molecular weight polymer.

Our invention may be better understood by reference to the following description, taken in connection with the following drawing, in which:

The sole figure is a cross-sectional view of an insulated electrical conductor within the scope of the present invention.

We have discovered that chlorine-containing, p-phenylene isophthalate, linear superpolyesters wherein at least 15 mole percent of the isophthalate groups have from 1 to 2 chlorine substituents on the aryl nucleus and the p-phenylene groups are selected from the group consisting of p-phenylene, monochloro-p-phenylene and dichloro-p-phenylene groups can be made which have intrinsic viscosities of at least 0.5. Surprisingly, the melting point is, at most, only slightly higher than the corresponding, lower molecular weight polyesters, but the physical properties are increased tremendously. These superpolyesters contain the structural unit

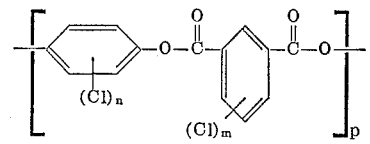

where $n$ is an integer from 0 to 2, $m$ is an integer from 0 to 2, but for at least 15 mole percent of the units is 1 to 2, and $p$ represents a number of repeating units in the molecular chain and, for our superpolyesters, it is probably at least 50 or higher. However, intrinsic viscosity is a better measure of molecular weight due to the uncertainties of determining the actual value of $m$, which, at best, is an average value of approximate magnitude.

Intrinsic viscosity is well known in the art and is described in detail in many places in published literature, for example, on page 309 of the book by P. J. Flory, "Principles of Polymer Chemistry," Cornell University Press, Ithaca, New York, 1953. An intrinsic viscosity of at least 0.5, which in the case of our polymers is measured at 75° C. while dissolved in 2,4,6-trichlorophenol, is necessary in order for the polymers to be used for the making of films and fibers having any utility. Polyesters having intrinsic viscosities below this value lack the necessary properties to form useful films and fibers as indicated by their brittleness which increases as the intrinsic viscosity decreases.

As will be readily apparent from the above structural unit, in any one polymer molecule, there can be p-phenylene isophthalate units, p-phenylene monochloroisophthalate units, p-phenylene dichloroisophthalate units, monochloro-p-phenylene isophthalate units, monochloro-p-phenylene monochloroisophthalate units, monochloro-p-phenylene dichloroisophthalate units, dichloro-p-phenylene isophthalate units, dichloro-p-phenylene monochloroisophthalate units, or dichloro-p-phenylene dichloroisophthalate units. When there is a mixture of any or all of these units, they can appear in ordered, random, or block arrangement of each of such units. The arrangement and ratio of units will be dependent on the order of reaction and ratio of reactants, for example, if a supercopolyester of p-phenylene monochloroisophthalate and monochloro-p-phenylene monochloroisophthalate is to be made (i.e., a superpolyester formed of p-phenylene monochloroisophthalate units, and monochloro - p - phenylene monochlorisophthalate units), monochloroisophthaloyl chloride may be reacted first with hydroquinone and then with chlorohydroquinone, or vice versa, or with a mixture of both, or in separate reactions and then mixed and cocondensed.

The preparation of these superpolyesters is made possible by our discovery that there is a particularly useful group of solvents having the unique property that, although they are not solvents for the polymer at ordinary temperatures, they do become solvents for the completely aromatic polyesters at elevated temperatures, and for the first time permit superpolyesters to be easily prepared from a dihydric phenol and an aromatic dicarboxylic acid when used in the form of the aromatic dicarbonyl halide. Surprisingly enough, not all solvents which are capable of dissolving the resinous polyesters resulting from the reaction are capable of producing the superpolyesters. This unique property appears to be limited to benzophenone, m-terphenyl, chlorinated biphenyls, brominated biphenyls, chlorinated diphenyl oxides, brominated diphenyl oxides, chlorinated naphthalenes and brominated naphthalenes. The reaction of dihydric phenols with aromatic dicarbonyl halides while dissolved in this special class of solvents is more particularly described and claimed in our copending application Serial No. 33,124, filed concurrently herewith and assigned to the same assignee as the present invention.

The above method is particularly applicable for the production of the fusible, thermoplastic, linear, chlorine-containing, p-phenylene isophthalate superpolyesters having an intrinsic viscosity of at least 0.5 and wherein at least 15 mole percent of the isophthalate groups have from 1 to 2 chlorine substituents in the aryl nucleus and the p-phenylene group are selected from the group consisting of p-phenylene, monochloro-p-phenylene, and dichloro-p-phenylene groups. These superpolyesters are prepared by the reaction of hydroquinone, monochlorohydroquinone, dichlorohydroquinone or a mixture of any of these hydroquinones with an isophthaloyl halide, monochloroisophthaloyl halide, a dichloroisophthaloyl halide, or a mixture of either of these three halides in either a 1-step process or a multiple-step process in which one of the hydroquinones is reacted with some or all of the chloroisophthaloyl halide and then further reacted with the balance of the hydroquinone and/or chlorisophthaloyl halide while dissolved in one of the above-named solvents. Preferably, the chlorisophthaloyl halides are monochloroisophthaloyl chloride and dichloroisophthaloyl halide. The exact ring position of the chlorine in either the hydroquinone or isophthaloyl halide is not important. Any of the various isomers are satisfactory for our products. The solution is heated to a temperature in the range of 270° C. up to the reflux temperature of the solution until the evolution of the hydrogen halide is at least substantially complete. In the multiple-step process of producing our compositions, this heating step is repeated after the addition of one or more additional reactants.

Alternatively, we have found that these superpolyesters may be prepared by another but less suitable method involving the use of the same specific group of solvents. This method involves the ester interchange reaction between a di-(monobasic acid)ester of the hydroquinone and a mono- or dichloroisophthalic acid. In this reaction, monochloroisophthalic acid and/or dichloroisophthalic acid and the diesters of hydroquinone and/or chlorohydroquinones, e.g., the diacetate, dipropionate, dibenzoate, etc., esters of hydroquinone or monochlorohydroquinone or dichlorohydroquinone are dissolved in the solvent if the 1-stage process is being used, and heated to a temperature in the range of 240° to 350° C. under reflux conditions which allow distillation of the monohydric acid moiety of the hydroquinone ester, e.g., acetic acid if the ester is p-phenylene diacetate (hydroquinone diacetate). In the 2-stage process, one diester or one chloroisophthalic acid may be added first and reacted, followed by the addition of a second diester or of another chloroisophthalic acid. In contrast to the 30 to 120 minutes required for the reaction of the acid halide with hydroquinone, the above ester interchange reaction requires an extremely long time, for example, from 6 to 10 hours. The products are dark colored and, because of the extended reaction time at elevated temperatures, contain solvent reaction products, especially if the solvent is halogenated. Furthermore, the ester interchange reaction is incapable of removing all of the monobasic acid ester groups and those still remaining in the polymer reduce the high temperature stability of the polymer. The monobasic acid ester groups which are not removed are also a measure of a lower molecular weight, since they occupy terminal groups which are potential chain propagating sites. This method is, however, capable of producing chlorine-containing, p-phenylene isophthalate, linear superpolyesters having an intrinsic viscosity in the range of 0.5 to 0.7. For best products, we prefer to use the reaction of hydroquinone and/or chlorohydroquinone with a chloroisophthaloyl chloride. Such a reaction is capable of producing transparent, water white, tough, strong products having intrinsic viscosities in the range of 0.5 to 2.0 and above. Either the 1-stage or 2-stage process may be used.

In our copending application Serial No. 33,131, filed concurrently herewith and assigned to the same assignee as the present invention, we have disclosed and claimed superpolyesters of p-phenylene isophthalate and mono- and dichloro-substituted p-phenylene isophthalates and supercopolyesters of these materials. As described in this specification, such compositions are quite highly crystalline and are therefore very useful in making fibers and films which are structurally oriented to increase their physical properties. However, when attempts are made to mold objects under heat and pressure it is necessary to quench the objects immediately to prevent the compositions from becoming cloudy and brittle due to their high tendency to crystallize. These quenched objects remain clear as long as they are not heated to a temperature above 200° C. We have now discovered that this tendency to crystallize can be reduced tremendously, to the extent that molded objects do not have to be quenched providing at least 15 mole percent of the isophthalate groups have from 1 to 2 chlorine substituents on the aryl nucleus. It was indeed surprising to find that the chlorine substituents on the isophthalate groups had such a profound effect whereas chlorine substituents on the p-phenylene group have a much lesser effect on crystallinity. For example, a superpolyester whose structural units are all monochloro-p-phenylene isophthalate units develops about the same degree of crystallinity on slow cooling as a superpolyester whose units are p-phenylene isophthalate units interspersed with only 15 mole percent p-phenylene monochloroisophthalate units, the lowest limit of the polyesters of this invention. These two compositions when molded under heat and pressure, if ejected, can be cooled in air without developing a hazy color indicative of crystallization. These compositions if cooled in the mold or subjected for long periods at 200° C. or above, will crystallize. On the other hand, the compositions of the present invention in which the p-phenylene chloroisophthalate units are greater than 15 mole percent, e.g., 25 mole percent or greater, do not develop haziness indicative of high crystallinity. The tendency to crystallize in the compositions containing 15 mole percent of p-phenylene chloroisophthalate units can be eliminated by, for example, using mixed mono- and dichloroisophthalate units, preferably in conjunction with one or a mixture of chlorop-phenylene units. Therefore, the compositions of the present invention which can be molded without formation of detrimental crystallization in subsequent heating cycles above 200° C. may be described as chlorine-containing, p-phenylene isophthalate, linear superpolyesters wherein at least 15 mole percent of isophthalate radicals have from 1 to 2 chlorine substituents on the aryl nucleus and the p-phenylene radicals are selected from the group consisting of p-phenylene, monochloro-p-phenylene, and dichloro-p-phenylene radicals.

Other related superpolyesters are disclosed and claimed in our copending patent applications which are filed concurrently herewith and assigned to the same assignee as the present invention:

(1) Linear superpolyesters formed of p-phenylene isophthalate units interspersed with p-phenylene terephthalate units, the intrinsic viscosity of the polyester being at least 0.5 and the isophthalate content being at least 60 mole percent of the total isophthalate and terephthalate content of the superpolyester, disclosed and claimed in our copending application Serial No. 33,125, now U.S. 3,036,990.

(2) Linear superpolyesters formed of p-phenylene isophthalate units interspersed with p,p'-biphenylene isophthalate units, the intrinsic viscosity of the superpolyester being at least 0.5 and the p-phenylene isophthalate units being at least 40 mole percent of the total p-phenylene isophthalate and p,p'-biphenylene isophthalate units in the superpolyester, disclosed and claimed in our copending application Serial No. 33,126, now U.S. 3,036,991.

(3) Linear superpolyesters having an intrinsic viscosity of at least 0.5 and formed of four structural units (1) p-phenylene units (2) units selected from the group consisting of o-phenylene units, m-phenylene units and o,o'-biphenylene units (3) isophthalate units and (4) terephthalate units, the sum of (1), (2), (3) and (4) equalling 100% of the total units of the polymer, the units of (1) being from 25 to 45% of the total units, the units of (2) being from 5 to 25% of the total units, the units of (3) being from 20 to 45% of the total units, the units of (4) being from 5 to 30% of the total units, the units of (1) and (2) forming esters with the units of (3) and (4), the sum of (1) and (2) being from 1 to 1.05 times the sum of (3) and (4) and the sum of (1) and (4) being no greater than 0.7 times the total sum of units, disclosed and claimed in our copending application Serial No. 33,128, now U.S. 3,036,992.

(4) Linear superpolyesters formed of m-phenylene terephthalate units interspersed with from 0 to 30 mole percent of p-phenylene terephthalate units, based on the total m-phenylene terephthalate and p-phenylene terephthalate units, the intrinsic viscosity of said superpolyester being at least 0.5, disclosed and claimed in our copending application Serial No. 33,130.

In order that those skilled in the art may understand our invention, the following examples are given by way of illustration and not by way of limitation.

EXAMPLE 1

A mixture of 11.34 grams (0.103 mole) of hydroquinone, 23.75 grams (0.10 mole) of 5-chloroisophthaloyl chloride and 250 grams of redistilled mixed trichlorobiphenyls were stirred and heated. After one minute the temperature of the homogeneous solution was 140° C. and the evolution of HCl had started. After 12 minutes the reaction mixture was at 310° C. and most of the HCl evolution had subsided. The reaction mixture was heated for an additional 53 minutes at a temperature of 312° C. At the end of this time a viscous, yellow solution resulted. When this solution was allowed to cool, the polymer precipitated at 165° C. to yield a pasty mixture. After the mixture had cooled to room temperature, one liter of acetone was added and the polymer was triturated in a blender. The polymer was isolated and washed 4 times with 1-liter portions of boiling acetone, filtered and dried by suction to yield 26.90 grams (96.8%) of white poly-p-phenylene-5-chloroisophthalate. The melting point of this polymer was 323°–349° C., and its intrinsic viscosity as measured in 2,4,6-trichlorophenol at 150° C. was $[\eta]=1.28$. This intrinsic viscosity actually corresponds to an intrinsic viscosity of 1.77 when it is extrapolated to 75° C. In order to get the temperature coefficient of intrinsic viscosity, a sample of poly-p-phenylene isophthalate terephthalate was used as reference. It was determined that the intrinsic viscosity of this sample was 0.97 in 2,4,6-trichlorophenol at 75° C. and 0.70 in the same solvent at 150° C. The intrinsic viscosity is greater at 75° C. by a ratio of $$\frac{0.97}{0.70}=1.38$$

over that at 150° C. This ratio of 1.38 was arbitrarily applied to the chlorinated isophthalate polymers when they were measured at 150° C. An intrinsic viscosity of 0.36 at 150° C. corresponds to a value of 0.50 at 75° C. and to some even higher value at room temperature, but since there are no solvents in which our polyesters are soluble at room temperature, we are unable to determine a value for intrinsic viscosity at room temperature.

The poly-p-phenylene-5-chloroisophthalate prepared by the method of Example 1 had an elementary analysis which agreed with the empirical formula $C_{14}H_7O_4Cl$.

Calculate: C, 61.2; H, 2.57; Cl, 12.9. Found: C, 61.1; H, 2.6; Cl, 12.8.

A film of this polymer was pressed between aluminum foil at a temperature of 400° C. under a pressure of 2000 lbs./square inch. The resulting film was transparent and quite tough and flexible. Films made in this manner are transparent and amorphous whether the hot films are quenched in ice water, slow cooled in air, or even allowed to cool over a period of 2 hours in the mold. These amorphous films have a density of 1.4082 grams/cc. Films can also be prepared by direct extrusion of the molten polymer through a die. When the extruded polymer is applied to a copper or aluminum wire, an insulated conductor is obtained. The molten polymer can also be extruded through a die to give a continuous monofilament or fiber of the polymer. The amorphous films or fibers of poly-p-phenylene-5-chloroisophthalate crystallize only with extreme difficulty. Thus, when films are aged for 114 hours at 275° C., the films remain transparent and exhibit an amorphous X-ray diffraction pattern. It is possible to crystallize the films by long term heating at 250° C. Thus, a film of poly-p-phenylene-5-chloroisophthalate slowly crystallizes at 250° C. and attains a density of 1.4204 grams/cc. after 784 hours at 250° C. This corresponds to a volume decrease of 0.87% due to crystallization.

EXAMPLE 2

This example illustrates the 1-stage method of preparing a poly-p-phenylene-isophthalate-5-chloroisophthalate copolymer. This type of synthesis results in a random copolymer.

A mixture of 11.10 grams of hydroquinone (0.100 mole), 10.1 grams of isophthaloyl chloride (0.050 mole), 11.9 grams of 5-chloroisophthaloyl chloride (0.050 mole), and 132.0 grams of mixed trichlorobiphenyls was placed in a reaction flask which was flushed with dry nitrogen gas. This mixture was stirred while gradually increasing the temperature. The reaction started at 140° C. and was accompanied by a vigorous evolution of hydrogen chloride gas. At 170° C., a clear, homogeneous solution was obtained. After a total of 10 minutes, the reaction mixture was at 320° C. and the evolution of HCl had subsided. The reaction was heated for an additional 4 minutes at 320°–334° C. to give a clear, viscous solution. The polymer precipitated at 205° C. when the reaction mixture was allowed to cool. Acetone (about 1 liter)

was added and the mixture was thoroughly stirred and filtered. The polymer was washed with four 1-liter portions of hot acetone, filtered and dried to give 23.4 grams (91.0%) of poly-p-phenylene isophthalate-5-chloroisophthalate. A sample of this polymer melted at 325°–332° C. and had an intrinsic viscosity of 0.51 in a 50–50 mixture of o-chlorophenol and 2,4,6-trichlorophenol at 117° C. The chlorine analysis of this polymer agreed with the empirical formula $C_{14}H_{7.5}O_4Cl_{0.5}$.

Calculated: Cl, 6.88. Found: Cl, 7.1.

Tough, transparent, flexible films of this polymer were prepared by pressing the powder between aluminum foil at 325°–400° C. and 2000 lbs./square inch pressure. The resulting films were transparent and amorphous whether the hot films were quenched or were allowed to cool slowly in the mold. The amorphous polymers had a density range of 1.371 to 1.375 grams/cc. For example, the density of an air-cooled film pressed at 335° C. and 2000 lbs./square inch pressure was 1.3750 grams/cc. The density of a similar film cooled in the mold over a one-hour period was 1.3745 grams/cc.

A copolymer containing some isophthalate units replacing 5-chloroisophthalate units does crystallize more easily than the homopolymer containing only the 5-chloroisophthalate structure. However, this crystallization is still slow enough to allow amorphous molded parts to be formed. A crystalline film of the copolymer made in this example was obtained by heating the amorphous film for 122 hours at 250° C. This crystalline film is still tough, flexible and transparent and has a density of 1.4000 grams/cc. This corresponds to a 2.1% decrease in volume due to crystallization.

EXAMPLE 3

This example illustrates the 2-stage process of preparing copolymers of poly-p-phenylene isophthalate-5-chloroisophthalate. These copolymers were prepared using excess hydroquinone as a chain stopper.

A mixture of 11.34 grams of hydroquinone (0.103 mole), 17.26 grams of isophthaloyl chloride (0.085 mole), and 170 grams of mixed trichlorobiphenyls was placed in a reaction flask which was flushed with dry nitrogen gas. This mixture was stirred while gradually increasing the temperature. At 150° C., a clear, homogeneous solution was obtained which was accompanied by a vigorous evolution of HCl. The reaction mixture was heated from 28° C. to 300° C. in a period of 5 minutes, and then at 300°–320° C. for 10 minutes. A solution of 3.56 grams of 5-chloroisophthaloyl chloride (0.015 mole) dissolved in 34 grams of mixed trichlorobiphenyls was added to the hot solution. An additional 20 grams of trichlorobiphenyl was used to rinse the addition funnel. After the addition, the reaction mixture was heated for 90 minutes at 310°–320° C. to give a clear, viscous solution. The polymer precipitated at 270° C., when the reaction mixture was allowed to cool. The polymer was washed free of solvent with acetone, filtered, and washed 4 times with 1-liter portions of hot acetone. The polymer was filtered and dried to give 23.95 grams (96.3%) of poly-p-phenylene isophthalate-5-chloroisophthalate copolymer. A sample of this polymer melted at 377°–381° C. and exhibited an intrinsic viscosity of 0.56 in 2,4,6-trichlorophenol at 160° C. The elementary analysis for chlorine is listed in Table I. Samples of this polymer were pressed at 415° C. and 2000 lbs./square inch pressure. The quenched film was completely transparent, amorphous, flexible and tough. The films cooled in the mold were translucent and crystalline but still flexible and tough. Thus, this copolymer containing only 15 mole percent of 5-chloroisophthalate blocks represents the limiting value for a molding compound not requiring quenching to produce satisfactory articles. Other copolymers containing increasing percentages of chloroisophthalate groups are listed in Table I. These other three copolymers all produced tough, flexible films at 375°–400° C. and 2000 lbs./square inch pressure. The films were amorphous and transparent whether the hot films were quenched or slowly cooled in the mold. These copolymers can be slowly crystallized by heating at 250° C. for long periods of time. As the chloroisophthalate content decreases, in the copolymer, the rate and extent of crystallization increases.

*Table I*

| Mole Ratio of R(COCl)₂ [a] | | Intrinsic Viscosity of Polymer [η] | M.P., ° C. | Yield, Percent | Precipitation Temp., ° C. | Analysis | | |
|---|---|---|---|---|---|---|---|---|
| CI | I | | | | | Empirical Formula | Calc'd., Percent Cl | Found, Percent Cl |
| 75 | 25 | [b] 1.02 | 330–352 | 97.3 | 160 | $C_{14}H_{7.25}O_4Cl_{0.75}$ | 10.0 | 10.4 |
| 51.5 | 48.5 | [c] 0.59 | 322–355 | 96.0 | 190 | | | |
| 25 | 75 | [b] 0.56 | 354–368 | 95.3 | 230 | $C_{14}H_{7.75}O_4Cl_{0.25}$ | 3.6 | 3.9 |
| 15 | 85 | [b] 0.56 | 377–381 | 96.3 | 270 | $C_{14}H_{7.85}O_4Cl_{0.15}$ | 2.17 | 2.3 |

[a] CI=5-Chloroisophthalate; I=Isophthalate.
[b] Measured in 2,4,6-trichlorophenol at 160° C.
[c] Measured in 2,4,6-trichlorophenol at 150° C.

EXAMPLE 4

This example illustrates the preparation of a 2-stage poly-p-phenylene isophthalate-5-chloroisophthalate prepared in a mixed monochlorobiphenyl solvent.

A mixture of 22.95 grams of hydroquinone (0.2085 mole), 24.70 grams of 5-chloroisophthaloyl chloride (0.104 mole), and 300.0 grams of mixed monochlorobiphenyls was placed in a reaction flask which was flushed with dry nitrogen gas. This mixture was stirred while gradually increasing the temperature. The following observations were noted:

| Elapsed Time, minutes | Temperature, ° C. | Remarks |
|---|---|---|
| 0 | 24 | Heterogeneous. |
| 7 | 150 | Clear solution, HCl evolution. |
| 20 | 265 | Clear solution allowed to cool. |
| 25 | 245 | 20.0 grams (0.0985 mole) isophthaloyl chloride added; heating resumed. |
| 31 | 265 | Rapid HCl evolution. |
| 33 | 272 | Clear solution. |
| 40 | 275 | Clear viscous solution. |
| 46 | 278 | Do. |

After 46 minutes, the solution was allowed to cool, whereupon the polymer precipitated at 190° C. When cooled to room temperature one liter of acetone was added and the mixture was stirred, allowed to settle and the solution decanted. The polymer was washed again with one liter of boiling acetone, filtered and dried. There was obtained 50.0 grams (96.0% yield) of poly-p-phenylene-isophthalate-5-chloroisophthalate copolymer in the form of a white powder. This polymer had a melting point of 322°–355° C. and an intrinsic viscosity [η]=0.59 in 2,4,6-trichlorophenol at 150° C. A sample was pressed at 400° C. and 1000 lbs./square inch pressure, followed by quenching in water to give a clear, transparent, flexible film. Amorphous, transparent, flexible films were also obtained when the hot films were allowed to cool slowly. A rectangular bar of polymer, ½" x ½" x 2½", was molded in a closed cavity stainless steel mold at 355° C. The resulting bar was tough, transparent and amorphous. Films of this copolymer exhibited tensile strengths in the order of 10,000 lbs./square inch and elongations in the range of 25%.

EXAMPLE 5

This example illustrates the preparation of a poly-p-phenylene isophthalate polymer containing one chlorine substituent in every benzene ring.

A mixture of 4.35 grams of monochlorohydroquinone (0.0300 mole), 7.10 grams (0.0299 mole) of 5-chloroisophthaloyl chloride, and 100 grams of mixed trichlorobiphenyls, was placed in a reaction flask which was flushed with dry nitrogen gas. This mixture was stirred while gradually increasing the temperature. At 150° C., a clear, homogeneous solution was obtained and the evolution of the HCl had started. The heating was continued and the temperature reached 320° C. after 12 minutes. The reaction was then kept at 320°–330° C. for 13 minutes to yield a viscous, clear polymer solution. The polymer precipitated at 75° C. when the reaction was allowed to cool. The polymer was washed 4 times with 500 ml. portions of hot methanol, filtered and dried to give 6.0 grams (65.0% yield) of polychloro-p-phenylene-5-chloroisophthalate, as a white powder. A sample of this polymer melted at 276°–295° C. and exhibited an intrinsic viscosity of 0.51 in a 50/50 mixture of o-chlorophenol and 2,4,6-trichlorophenol at 117° C. The elementary analysis for chlorine agreed with the empirical formula $C_{14}H_6O_4Cl_2$.

Calculated: Cl, 22.9. Found: Cl, 23.4.

Samples of this polymer formed tough, flexible, transparent films when pressed at 290°–300° C. and 1000 lbs./square inch pressure. The films were amorphous and transparent whether the hot films were quenched or slowly cooled in the mold. The density of the films of polychloro-p-phenylene-5-chloroisophthalate was 1.4850 grams/cc. The powder and the films of this polymer were completely amorphous as evidenced by the absence of any rings in the X-ray diffraction patterns. This polymer could not be crystallized at all by heating at temperatures from 200°–250° C. for an extended period of time.

EXAMPLE 6

This example illustrates that the crystallization of a poly-p-phenylene-isophthalate-5-chloroisophthalate copolymer is reduced further by substituting chloro-p-phenylene groups for the p-phenylene units in the copolymer. The fourth copolymer in Table I is a p-phenylene polymer containing a 15:85 ratio of 5-chloroisophthalate to isophthalate units and formed translucent films when the molded films were slowly cooled in the molds. The polymer described in this example contains chloro-p-phenylene units and can be molded without crystallization occurring.

A mixture of 14.75 grams of chlorohydroquinone (0.102 mole), 17.26 grams of isophthaloyl chloride (0.085 mole), 3.55 grams of 5-chloroisophthaloyl chloride (0.015 mole), and 255 grams of mixed trichlorobiphenyls was stirred and heated. After 1½ minutes of heating, the temperature was 200° C. and a homogeneous solution was obtained accompanied by rapid HCl evolution. After 12 minutes, the temperature was 320° C. and a viscous tan solution was obtained. The mixture was heated for an additional 22 minutes at 318°–320° C. to give a viscous, clear solution. The polymer precipitated at 165° C. when the reaction mixture was allowed to cool. The solid polymer was freed from solvent with acetone and was washed 4 times with 1-liter portions of hot acetone. The polymer was filtered and dried to give 27.25 grams (96.4% yield) of poly-chloro-p-phenylene isophthalate-5-chloroisophthalate copolymer, melting at 304°–316° C. It had an intrinsic viscosity of 0.50 in 2,4,6-trichlorophenol at 75° C. The elementary analysis agreed with the empirical formula $C_{14}H_{6.85}O_4Cl_{1.15}$.

Calculated: C, 60.1; H, 2.46; Cl, 14.6. Found: C, 59.4; H, 2.1; Cl, 15.5.

Tough, flexible films of this polymer were pressed at 350°–415° C. and 2000 lbs./square inch pressure. The resulting films were transparent and amorphous whether the hot films were quenched or were allowed to cool slowly in the mold.

EXAMPLE 7

This example illustrates the preparation of a poly-p-phenylene isophthalate polymer containing two chlorine atoms in every isophthalate group.

A mixture of 2.83 grams of hydroquinone (0.0257 mole), 6.80 grams of 4,6-dichloroisophthaloyl chloride (0.0250 mole), and 70.0 grams of mixed trichlorobiphenyls, was stirred while gradually increasing the temperature. After 2 minutes, the temperature was 150° C. and a clear homogeneous solution was obtained. The HCl evolution which results from the polycondensation was vigorous. At 312° C., a light brown solution was obtained and the HCl evolution had subsided. The reaction mixture was heated for an additional 22 minutes at 310°–320° C. to yield a viscous, brown solution. The polymer precipitated at 180° C. when the reaction mixture was cooled. The solid polymer was washed 4 times with 500 ml. portions of boiling acetone, filtered, and dried to give 7.47 grams (95.5% yield) of poly-p-phenylene-4,6-dichloroisophthalate as a tan powder, which melts at 340° C. with decomposition. The chlorine analysis agreed with the empirical formula $C_{14}H_6O_4Cl_2$.

Calculated: Cl, 22.9. Found: Cl, 22.7.

A sample of polymer was pressed at 415° C. and 2000 lbs./square inch pressure to give a tough, flexible, brown film when quenched in water.

EXAMPLE 8

This example illustrates the preparation of a poly-p-phenylene isophthalate polymer containing one chlorine atom in the p-phenylene units and two chlorine atoms in the isophthalate units.

In a similar manner to that described in Example 7, a mixture of 3.62 grams of chlorohydroquinone (0.0250 mole), 6.80 grams of 4,6-dichloroisophthaloyl chloride (0.0250 mole), and 77.0 grams of distilled mixed trichlorobiphenyls was stirred and heated. The reaction was heated in 9 minutes from 28° C.–300° C. and then for 30 minutes at 315°–320° C. The polymer precipitated at 150° C. from the dark reaction mixture. There was obtained 8.49 grams (88.1% yield) of brown, acetone washed poly-chloro-p-phenylene-4,6-dichloroisophthalate melting at 285°–305° C. The chlorine analysis agreed with the empirical formula $C_{14}H_5O_4Cl_3$.

Calculated: C, 31.0. Found: C, 30.9.

A sample of polymer was pressed at 325° C. and 2000 lbs./square inch pressure to give a tough, flexible, light brown film. This polymer is quite flame resistant and will burn slowly only when held directly in a flame; when the flame is removed, it extinguishes itself immediately. It was observed that as the chlorine content of our polymers increased, the flammability decreased.

EXAMPLE 9

This example illustrates the preparation of a poly-p-phenylene isophthalate polymer containing two chlorine atoms in the p-phenylene units and one chlorine atom in the isophthalate units.

This polymer was prepared by essentially following the directions of Example 7. A mixture of 4.48 grams of sublimed, mixed dichlorohydroquinone (0.0250 mole), 5.94 grams of 5-chloroisophthaloyl chloride (0.0250 mole), and 77.3 grams of mixed pentachlorobiphenyls, was stirred and heated. The reaction mixture was heated in 13 minutes from 28° C. to 300° C. and for 22 additional minutes at 360°–365° C. The polymer precipitated at 85° C. from the dark reaction mixture. It was isolated and washed with acetone as described in Example 7. There was obtained 8.85 grams of poly-di-chloro-p-phenylene-5-chloroisophthalate as a light brown powder melting at 334°–345° C. A sample was pressed at 350° C. and 2000 lbs./square inch pressure followed by quenching. The resulting film was a light brown, hard film which could be flexed about 160° without breaking. This film was extremely flame-resistant and burned slowly only when held in the center of a hot flame.

EXAMPLE 10

This example illustrates the preparation of an insulated conductor by casting a solution of the polymer made in Example 2 on a nickel coated copper wire.

A solution of poly-p-phenylene-isophthalate-5-chloro-isophthalate (Example 2) was prepared by dissolving 2 grams of polymer in 23 grams of U.S.P. cresol at 100° C. The resulting solution was clear at 75°–100° C. but formed a hazy gel when cooled to room temperature. Nickel coated copper wire, 42.7 mils in diameter, was dipped in the hot polymer solution at 150° C. After each applied coat, a 3-minute bake at 300° C. was given to the wire. There were 4 coats applied to give a total build of 0.8 mil of polymer. Finally, a ½ hour post-bake at 300° C. was given to the coated wire. The resulting insulated conductor was coated with a flexible polymer film. The insulated film of a wire twisted around its own diameter was continuous and stayed flexible after heating the twisted wire for ½ hour at 200°–250° C.

EXAMPLE 11

This example illustrates the general procedure by which our polymers may be made by an ester interchange reaction providing that our particular solvents are used. This process is not as desirable since it is more time consuming and produces colored products which are in the lowest intrinsic viscosity range required to have the desirable properties of our polymers.

A mixture of 20.0 grams (0.103 mols) of p-phenylene diacetate, 20.1 grams (0.100 mole) of 5-chloroisophthalic acid, and 220 grams of mixed trichlorobiphenyl is stirred and heated. At 250° C., the acetic acid begins to form and is distilled out of the reaction mixture. The reaction is carried out for 6–8 hours at 290°–300° C. to yield a light brown viscous solution. During this time, 98–99% yield of the theoretical acetic acid is distilled. The polymer precipitates at 170° C., and is isolated, washed 4 times with 1-liter portions of hot acetone, filtered and dried to give 27–27.6 grams (96–99% yield) of poly-p-phenylene-5-chloroisophthalate as a tan powder. This polymer has an intrinsic viscosity of 0.50 to 0.62 in trichloroacetic acid at 75° C. Tough, flexible, transparent, yellow films are obtained by pressing this polymer at 350°–400° C. and 2000 lbs./square inch pressure.

If it is desired to modify the molecular weight of our linear polyesters, chain stopping agents such as one or more monohydric phenols or one or more monobasic acid chlorides may be added in minor amounts, e.g., 0.1 to 1% of the corresponding difunctional compound may be added along with the other ingredients, during the condensation reaction, or after the main condensation reaction is completed. Examples of monohydric phenols which may be added are phenol itself, the cresols, e.g., ortho-, meta- and para-cresol, the xylenols, e.g., 2,3-xylenol, 2,4-xylenol, 2,5-xylenol, 2,6-xylenol, 3,5-zylenol, etc., the hydrocarbons and hydrocarbonoxy-substituted phenols, e.g., ethylphenol, propylphenol, isopropylphenol, butylphenol, tertiary butylphenol, amylphenol, the phenylphenols, naphthylphenols, the phenoxyphenols, the methoxyphenols, ethoxyphenols, phenoxyphenols, etc., including all of those phenols in which one or more of the hydrogen atoms attached to the aryl nucleus are replaced by a halogen atom such as fluorine, chlorine, bromine, or iodine, e.g., the mono-, di-, tri-, tetra- and pentachlorophenols, the mono-, di-, tri-, tetra- and pentabromophenols, the mono-, di-, tri-, tetra-, and penta-iodophenols, the mono-, di-, tri-, tetra- and pentafluorophenols, the mono-, di-, tri-, tetrachlorocresols, and the mono-, di-, tri-, chloroxylenols, etc. The monohydric phenol may also be a di- or trihydric phenol in which all but one hydroxyl group has been esterified with an acid, e.g., p-hydroxyphenylbenzoate, p-hydroxyphenyltoluate, m-hydroxyphenylbenzoate, o-hydroxyphenylbenzoate, 5-hydroxyphenylene-1,3 dibenzoate, etc.

In those cases where free hydroxyl groups are desired in the polymer chain, a dihydric phenol, e.g., hydroquinone, resorcinol, etc., may be used as the chain stopping agent.

Monobasic acid halides which may be used are the acid halides of the aromatic series such as benzoyl chloride, benzoyl bromide, benzoyl iodide, toluoyl chloride, naphthoyl chloride, biphenylcarbonyl chloride, etc., including halogenated derivatives thereof. Although monobasic acid halides of the aliphatic series may be used, we prefer not to use them since they destroy the high temperature stability of the polymers. For the same reason, we prefer that the esters of the di- and trihydric phenols be aromatic monocarboxylic acid esters and that, if substituted, the substituent grouping be chlorine.

The superpolyesters of this invention are suitable for a wide variety of uses; as coating compositions they may be coated onto metallic or non-metallic substrates, by flame spraying, melt casting, or by casting while dissolved in one of the solvents in which it is made, or other solvent in which it is soluble, and thereafter evaporating the solvent at an elevated temperature and, if desired, at reduced pressure. The hot solution of the solvent may be forced through a spinneret into a heated drying tower, preferably maintained at reduced pressure, to form filaments or fibers, or the molten polymer may be forced through spinnerets by well known techniques to form filaments and fibers. The fibers so formed may be formed into yarns or used to form fiber matting. Alternatively, the superpolyesters may be cast from solution or from the melt of the polymer, extruded through a die, or otherwise sheeted to form a continuous film of the superpolyester. Referring to the drawing, the compositions may also be extruded or applied from solution onto electrical conductor 1, such as a wire, to form an insulated electrical conductor having our compositions as insulating layer 2. The compositions may also be injection, transfer, or compression molded under heat and pressure to form intricately shaped objects of wide utility, dependent on the particular object molded. Other uses for our films and the fabrics or mats made from the fibers include a wide variety of electrical applications, that is, as a dielectric, for example, as a dielectric in capacitors, as slot insulation for motors, primary insulation for heat-resistant wire, pressure-sensitive electrical tape, split mica insulating tape, i.e., mica sheet laminated between film, small condensers, metal foil laminated to film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electroluminescent structures, etc. Those compositions containing a high percentage of chlorine are flame-proof and may be used for a wide variety of applications requiring a non-flammable material. Our compositions may also be used to laminate or adhere glass and metal surfaces to themselves or to each other, or to other similar surfaces; for example, two glass surfaces may be laminated together by inserting an interlayer of the superpolyester either as a powder, as a film, or as a surface coating between two glass surfaces to be joined. Pressure or vacuum is applied to the assembly after it is heated to the softening point of the superpolyester to firmly adhere the two glass surfaces together. This process may be used for forming vacuum-tight seals between two mating glass objects such as for making a glass envelope, for example a cathode ray tube, disclosed and claimed in Day et al. application Serial No. 33,129, filed concurrently herewith and assigned to the same assignee as the present invention.

Other valuable uses for the superpolyesters of this invention will be readily apparent to those skilled in the art. Also, many apparently widely different embodiments such as the adding of pigments, fillers, stabilizers, plasticizers, etc., may be made to modify the properties of the superpolyesters without departing from the spirit and scope of our invention. It is therefore to be understood that changes may be made in the particular embodiments of the invention described which are within the full intended scope of the invention as defined by the appended claims.

What we claim as new and desire to secure by Letters Patent of the United States is:

1. A superpolyester consisting essentially of chlorine containing p-phenylene isophthalate, having an intrinsic viscosity of at least 0.5 measured at 75° C., wherein at least 15 mol percent of the isophthalate radicals of the said p-phenylene isophthalate have from 1 to 2 chlorine substituents on the aryl nucleus of the isophthalate radical and the p-phenylene radicals of the said p-phenylene isophthalate are selected from the group consisting of p-phenylene, monochloro-p-phenylene, dichloro-p-phenylene radicals and mixtures of said radicals, said superpolyester being clear and free of any tendency to develop haziness which is indicative of a highly crystalline state.

2. The superpolyester of claim 1 in which the p-phenylene radicals are unsubstituted p-phenylene radicals.

3. The superpolyester of claim 1 in which the p-phenylene radicals are dichloro-p-phenylene radicals.

4. The superpolyester of claim 1 in which the p-phenylene radicals are monochloro-substituted p-phenylene radicals.

5. A linear superpolyester consisting essentially of p-phenylene monochloro-isophthalate having an intrinsic viscosity of at least 0.5 measured at 75° C., said superpolyester being clear and free of any tendency to develop haziness which is indicative of a highly crystalline state.

6. A linear superpolyester consisting essentially of monochloro-p-phenylene monochloro-isophthalate having an intrinsic viscosity of at least 0.5 measured at 75° C., said superpolyester being clear and free of any tendency to develop haziness which is indicative of a highly crystalline state.

7. The linear superpolyester consisting essentially of p-phenylene dichloro-isophthalate having an intrinsic viscosity of at least 0.5 measured at 75° C., said superpolyester being clear and free of any tendency to develop haziness which is indicative of a highly crystalline state.

8. A linear superpolyester consisting essentially of monochloro-p-phenylene dichloro-isophthalate having an intrinsic viscosity of at least 0.5 measured at 75° C., said superpolyester being clear and free of any tendency to develop haziness which is indicative of a highly crystalline state.

9. A linear superpolyester consisting essentially of dichloro-p-phenylene monochloro-isophthalate having an intrinsic viscosity of at least 0.5 measured at 75° C., said superpolyester being clear and free of any tendency to develop haziness which is indicative of a highly crystalline state.

10. A linear superpolyester consisting essentially of dichloro-p-phenylene dichloro-isophthalate having an intrinsic viscosity of at least 0.5 measured at 75° C., said superpolyester being clear and free of any tendency to develop haziness which is indicative of a highly crystalline state.

11. An insulated electrical conductor comprising an electrical conductor having on its surface an insulating layer of a superpolyester consisting essentially of chlorine-containing p-phenylene isophthalate having an intrinsic viscosty of at least 0.5 measured at 75° C., wherein at least 15 mol percent of the isophthalate radicals of said p-phenylene isophthalate have from 1 to 2 chlorine substituents on the aryl nucleus of the isophthalate radiacal and the p-phenylene radicals of said p-phenylene isophthalate are selected from the group consisting of p-phenylene, monochloro-p-phenylene, dichloro - p - phenylene radicals and mixtures of said radicals, said superpolyester being clear and free of any tendency to develop haziness which is indicative of a highly crystalline state.

References Cited by the Examiner

UNITED STATES PATENTS

| 2,595,343 | 5/52 | Drewitt et al. | 260—47 |
| 2,954,355 | 9/60 | Young et al. | 260—75 |

FOREIGN PATENTS

| 553,841 | 6/57 | Belgium. |
| 1,175,362 | 11/58 | France. |

WILLIAM H. SHORT, *Primary Examiner.*

H. N. BURSTEIN, P. E. MANGAN, LEON J. BERCOVITZ, *Examiners.*